(12) United States Patent
Muhassin et al.

(10) Patent No.: US 12,266,135 B2
(45) Date of Patent: Apr. 1, 2025

(54) UNIVERSAL SENSOR PERFORMANCE AND CALIBRATION TARGET FOR MULTI-SENSOR IMAGING SYSTEMS

(71) Applicant: Motional AD LLC, Boston, MA (US)

(72) Inventors: Nijumudheen Muhassin, Pittsburgh, PA (US); Yew Kwang Low, Singapore (SG); Jayesh Dwivedi, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 446 days.

(21) Appl. No.: 17/581,637

(22) Filed: Jan. 21, 2022

(65) Prior Publication Data

US 2023/0252678 A1 Aug. 10, 2023

(51) Int. Cl.
*H04N 17/02* (2006.01)
*G01S 7/40* (2006.01)
(Continued)

(52) U.S. Cl.
CPC .................. *G06T 7/80* (2017.01); *G01S 7/40* (2013.01); *G01S 7/497* (2013.01); *G01S 13/89* (2013.01);
(Continued)

(58) Field of Classification Search
CPC ........... G06T 7/80; G06T 5/73; H04N 25/615; H04N 17/002; H04N 17/02; G01S 7/40; G01S 7/497; G01S 13/89; G01S 17/89
(Continued)

(56) References Cited

U.S. PATENT DOCUMENTS 8,223,193 B2 * 7/2012 Zhao ...................... G01D 15/00
348/45
9,319,666 B1 * 4/2016 Lisin ......................... G06T 7/80
(Continued)

FOREIGN PATENT DOCUMENTS

CN 113628280 A 11/2021

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
(Continued)

*Primary Examiner* — Trang U Tran
(74) *Attorney, Agent, or Firm* — Knobbe, Martens, Olson & Bear, LLP

(57) ABSTRACT

Provided are systems and methods used for calibration of camera/sensor systems. A calibration target system can include at least one calibration target element and at least one black body source. The calibration target element can include an outer perimeter, a modular transfer function (MTF) testing area, a through hole extending through the at least one calibration target, and a plurality of slots extending through the at least one calibration target. The MTF testing area can comprise a light-absorbing surface and at least one slant edge that is non-orthogonal with respect to any side of the outer perimeter. The black body source can be positioned behind the at least one calibration target elements and configured to emit black body radiation such that the black body radiation passes through the through hole and the plurality of slots.

20 Claims, 10 Drawing Sheets

(51) Int. Cl.
  *G01S 7/497* (2006.01)
  *G01S 13/89* (2006.01)
  *G01S 17/89* (2020.01)
  *G06T 5/73* (2024.01)
  *G06T 7/80* (2017.01)
  *H04N 17/00* (2006.01)
  *H04N 25/615* (2023.01)

(52) U.S. Cl.
  CPC ............... *G01S 17/89* (2013.01); *G06T 5/73* (2024.01); *H04N 17/002* (2013.01); *H04N 25/615* (2023.01)

(58) Field of Classification Search
  USPC .......................................................... 348/187
  See application file for complete search history.

(56) References Cited

U.S. PATENT DOCUMENTS

| | | | | |
|---|---|---|---|---|
| 9,674,433 | B1* | 6/2017 | De La Cruz | G06T 7/80 |
| 10,091,475 | B2* | 10/2018 | Ishikawa | H04N 3/223 |
| 10,453,218 | B2* | 10/2019 | Doganis | G06T 7/80 |
| 10,510,162 | B2* | 12/2019 | Doganis | G06T 7/80 |
| 2009/0185183 | A1* | 7/2009 | Zangooie | H01L 21/681 |
| | | | | 73/1.01 |
| 2009/0201376 | A1* | 8/2009 | Bauer | H04N 23/20 |
| | | | | 348/187 |
| 2012/0069193 | A1 | 3/2012 | Ramegowda et al. | |
| 2014/0253738 | A1* | 9/2014 | Mullis | H04N 17/002 |
| | | | | 348/187 |
| 2014/0333729 | A1* | 11/2014 | Pflug | G06T 15/50 |
| | | | | 348/47 |
| 2021/0274071 | A1 | 9/2021 | Kuperman et al. | |
| 2021/0303898 | A1 | 9/2021 | Wang et al. | |
| 2022/0006931 | A1 | 1/2022 | Tobaly et al. | |

OTHER PUBLICATIONS

Great Britain Office Action issued for Application No. GB 2202036.6, dated Aug. 16, 2022.

German Formalities Office Action issued for Application No. DE 102022104056.9, dated Mar. 3, 2023.

Great Britain Office Action issued for Application No. GB 2202036.6, dated Jul. 25, 2023.

Korean Office Action issued for Application No. KR 10-2022-0022769, dated Dec. 18, 2023.

* cited by examiner

UNIVERSAL SENSOR PERFORMANCE AND CALIBRATION TARGET FOR MULTI-SENSOR IMAGING SYSTEMS

DETAILED DESCRIPTION

Figure 1:
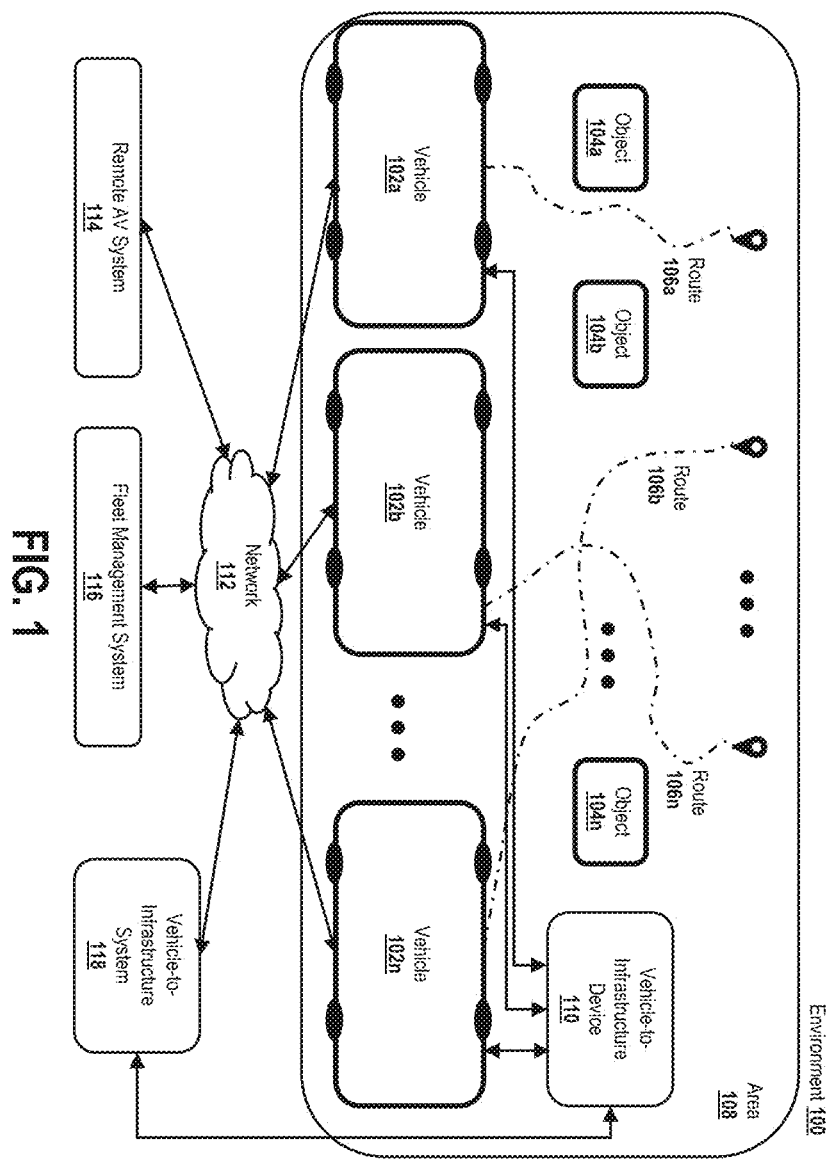
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein provide systems and methods for calibrating and performance testing of one or more (e.g., five) different camera/sensor systems with use of a single calibration target. In some examples, the target can include a through hole at the center of the target, an area with vertical slots, an area with horizontal slots, areas having light absorbing surfaces, and/or angled or slanted edges between the neighboring areas. A black body source can be positioned behind the target and configured to emit black body radiation through the through hole and slots. A checkerboard style target can be used comprising multiple individual targets. During use, the target can be moved around to different positions (locations, angles, etc.) for calibration and/or performance testing.

Advantages of the implementation of systems and methods described herein, include a reduction in the complexity of multi-sensor calibration through the use of a single calibration target. The use of a single target can also improve extrinsic calibration accuracy because the chance of variability between multiple targets is removed. The target is also capable of measuring optical performance of different types of optical systems, therefore extra data collection is not required.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
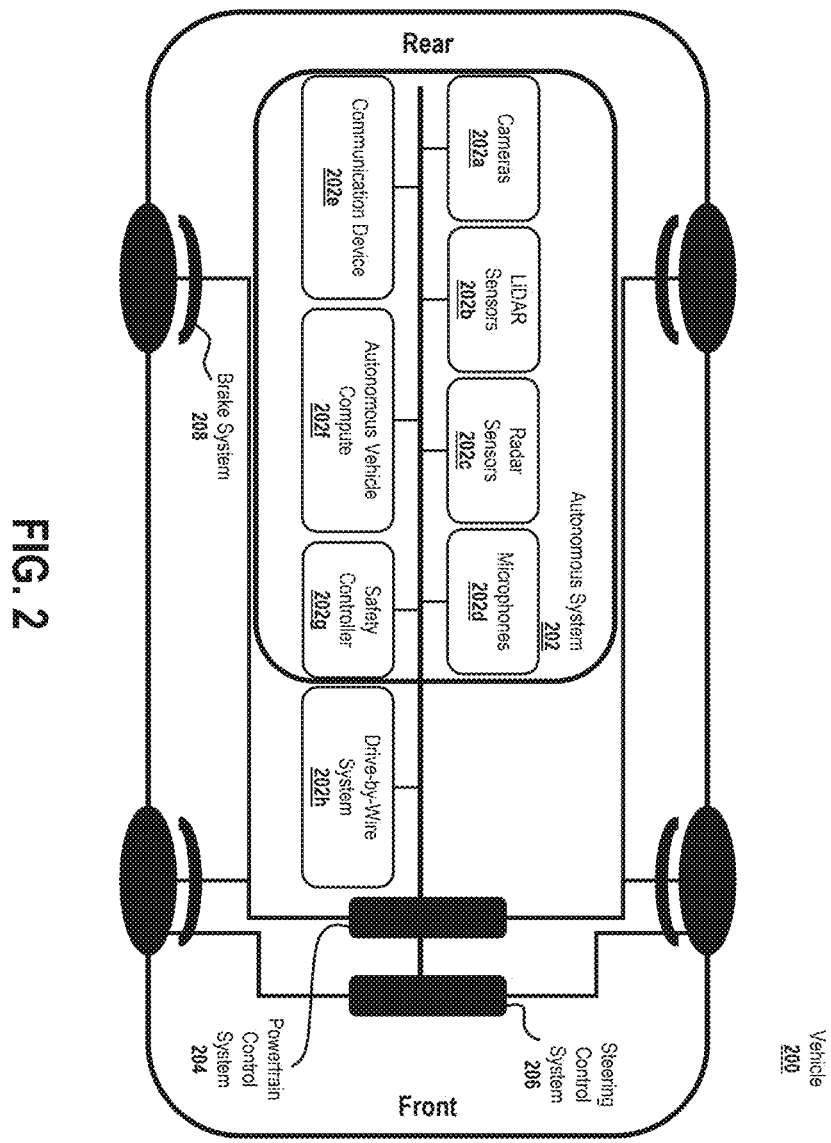
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
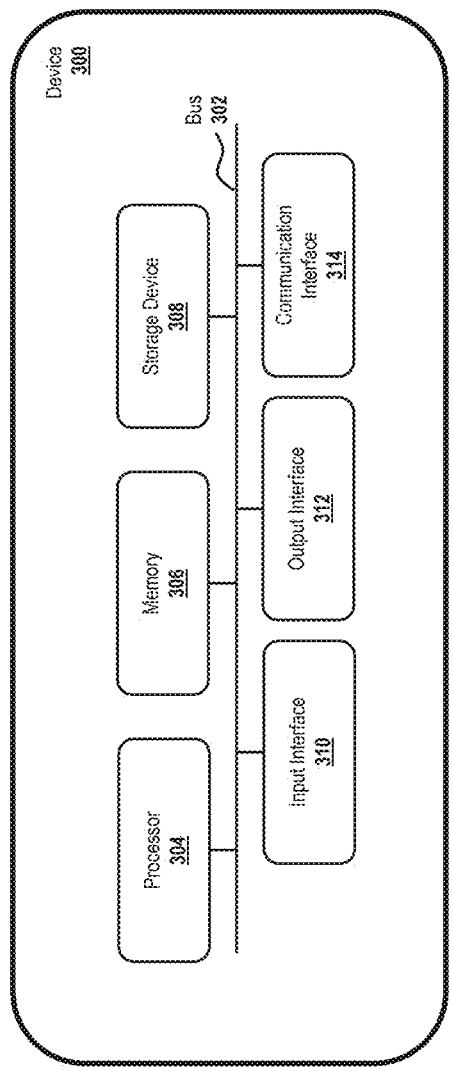
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LIDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LIDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LIDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of V2I device 110, at least one device of remote AV system 114, at least one device of fleet management system 116, at least one device of V2I system 118, at least one device of vehicle 200 (e.g., at least one device of autonomous system 202, at least one device of DBW system 202h, at least one device of powertrain control system 204, at least one device of steering control system 206 and/or one or more devices of network 112 (e.g., one or more devices of a system of network 112). In some embodiments, one or more devices of vehicles 102 (e.g., one or more devices of a system of vehicles 102), at least one device of V2I device 110, at least one device of remote AV system 114, at least one device of fleet management system 116, at least one device of V2I system 118, at least one device of vehicle 200 (e.g., at least one device of autonomous system 202, at least one device of DBW system 202h, at least one device of powertrain control system 204, at least one device of steering control system 206, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
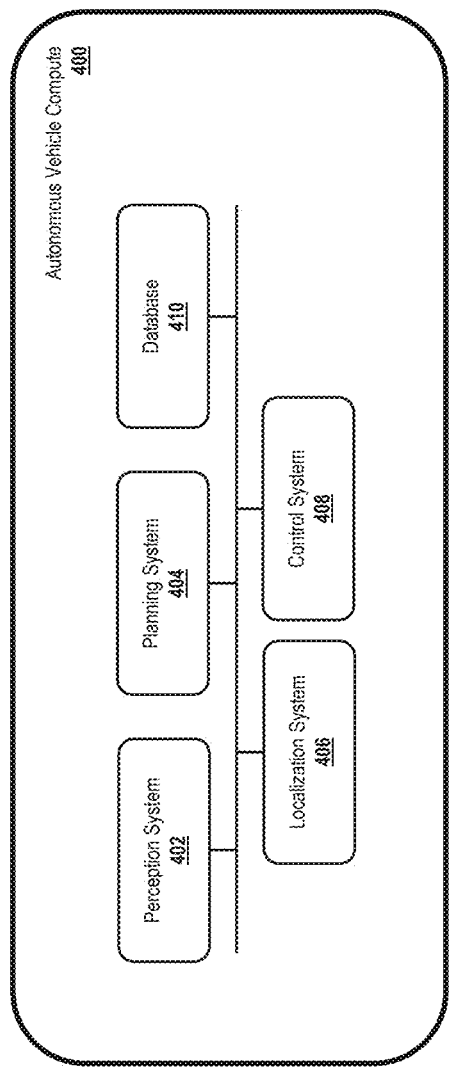
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LIDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

In an autonomous system (such as an autonomous vehicle (AV)), sensor fusion can be a critical aspect for different sensors to function harmoniously. For a successful sensor fusion algorithm, intrinsic and extrinsic calibration between two or more sensors can be pivotal. Extrinsic calibration is the process to obtain the extrinsic parameters that define the rigid relationship, e.g., rotation matrix and translation vector between two sensors, hence the two coordinate system.

AV's can include an array of different optical systems, including but not limited to, Visible Cameras (VIS), Near Infrared Cameras (NIR), Short Wave Infrared Cameras (SWIR), Middle Wavelength Infrared Cameras (MWIR), and/or Long Wavelength Infrared Cameras (LWIR). These cameras (for example, Cameras 202a as shown in FIG. 2) can operate under different spectral wavelengths. Therefore, to perform intrinsic and extrinsic calibration of all sensors a typical calibration target cannot be used, for example, a typical chessboard extrinsic calibration target. A typical chessboard calibration target, for example, may be intended and designed for the calibration of a single specific camera or sensor. In contrast, the targets provided herein can include elements or features that allow for the calibration of more than one type of camera/sensor systems. The different elements or features can correspond to the different cameras/sensors as described herein. Further, a calibration target is needed that can measure the Modular Transfer Function (MTF) of all sensors. MTF is a key indicator for an optical system and may be referred to herein as the optical performance of a sensor. The calibration targets/grids described herein can be used for calibration as well as to measure MTF.

Figure 5A:
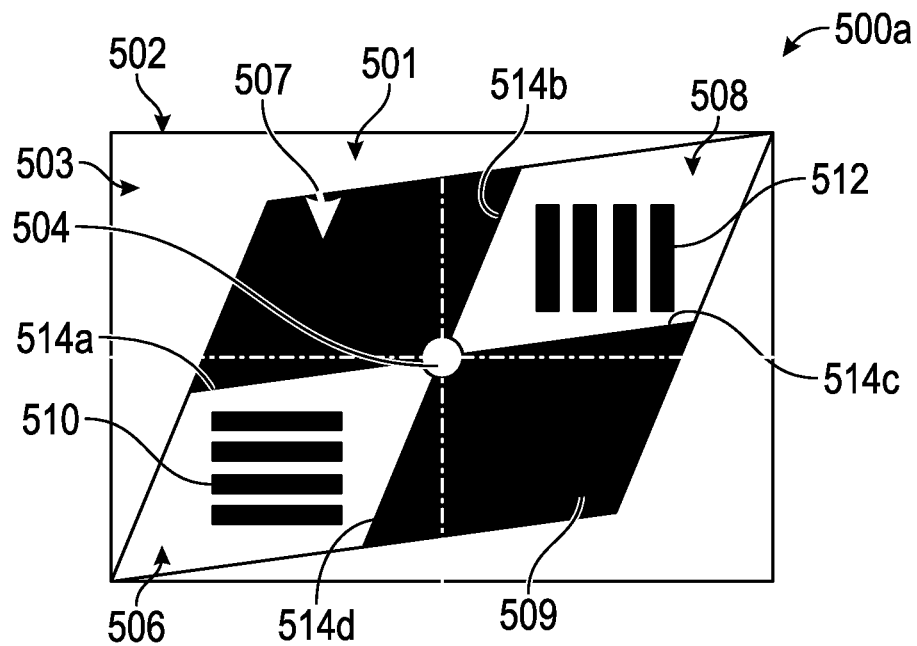
FIGS. 5A and 5B are example embodiments of calibration targets.
Figure 5B:
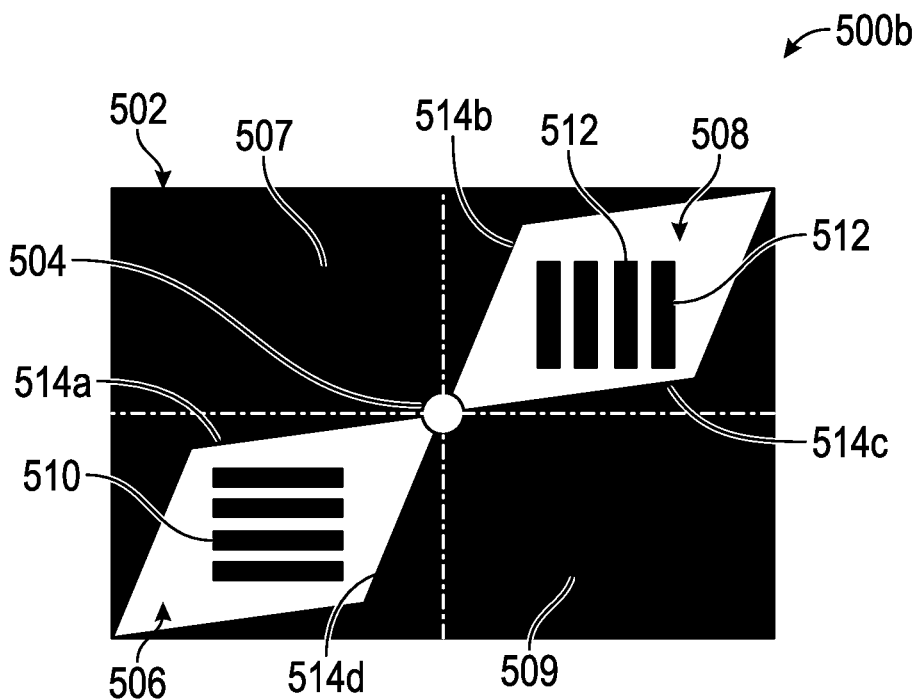

FIGS. 5A and 5B are example embodiments of calibration targets, also referred to as calibration elements, 500a, 500b. The example calibration targets 500a, 500b can share similar features or have any combination of features described herein with reference to any embodiment. With reference to FIG. 5A, the calibration target 500a can include an outer perimeter 502 with an inner target 501 positioned within the outer perimeter 502. A background area 503 can at least partially surround the inner target 501. In some instances, the background area 503 can be a light or white color (e.g., as shown in FIG. 5A). In some instances, the background area 503 can be a dark or black color (e.g., as shown n FIG. 5B). The background area 503 can be a different color than the inner target 501. The inner target 501 can include a through hole 504. The through hole 504 can extend through the calibration target 500a. The through hole 504 can be positioned at or near the center of the inner target 501.

The inner target 501 can include a first 506, second 507, third 508 and fourth 509 area. The areas 506, 507, 508, 509 can fill the entire inner target 501. In some embodiments, the individual areas 506, 507, 508, 509 can have a generally parallelogram type shape. In some embodiments, only the first 506 and third 508 areas have a generally parallelogram type shape. In some embodiments, the second 507 and fourth 509 areas can be part of the background area 503 (e.g., as shown in FIG. 5B). In some embodiments, the inner target 501 can include less than four defined areas. In some embodiments, the inner target 501 can include more than four defined areas. In some embodiments, the inner target 501 can alternate similar to a checkerboard pattern and comprise alternating light and dark areas.

In some embodiments, as shown in FIGS. 5A and 5B, the first area 506 can have a first corner or edge that aligns with a first corner of the outer perimeter 502. The first area 506 can have a second corner or edge opposite or across from the first corner that extends to the through hole 504. In some embodiments, the third area 508 can have a first corner or edge that aligns with a second corner of the outer perimeter 502. The first area 506 can have a second corner or edge opposite or across from the first corner that extends to the through hole 504. The first area 506 and the second area 508 can be on opposite sides of the through hole 504.

The first area 506 can include a plurality of slots 510. Any number of slots 510 can be used. For example, one, two, three, four or more slots 510. Each individual slot 510 can have a width that exceeds its height. The slots 510 can extend through the calibration target 500a. The slots 510 can have a generally rectangular shape. The first area 506 can be a light or white color. The plurality of slots 510 (or any other plurality of slots described herein, e.g., slots 512) can be configured for minimum resolvable temperature (MRTD) testing by viewing the black body source (described in more detail below) through the plurality of slots 510. The size of the slots 510, 512 can be dependent upon the field of view of the particular sensors being tested. The target (e.g., calibration targets 500a, 500b) can be configured to cover more than 8 percent of the field of view of the sensor. The size of the slots 510, 512 can be dependent on the resolution of the sensor. For example, if the sensor has a low resolution the size of slots 510, 512 can be larger.

The second area 507 can share a first edge 514a with the first area 506. The first edge 514a can be slanted relative to a horizontal or vertical plane. The second area 507 can comprise a light absorbing surface. The second area 507 can be a dark or black color. The light absorbing surface, and any light absorbing surface described herein, can be configured to absorb visible light, near infrared light, and/or short wavelength infrared light. The light absorbing surface can have a low illuminance as measured in Lux units. In some embodiments, the light absorbing surface can have less than about 20 percent absorption, less than about 10 percent absorption, less than about 5 percent absorption, or any value in between.

The third area 508 can share a second edge 514b with the second area 507. The second edge 514b can be slanted relative to a horizontal or vertical plane. The third area 508 can comprise a second plurality of slots 512. Any number of slots 512 can be used. For example, one, two, three, four or more slots 512. Each individual slot 512 can have a height that exceeds its width. The slots can extend through the calibration target 500a. The slots 512 can have a generally rectangular shape. The third area 508 can be a light or white color.

The fourth area 509 can share a third edge 514c with the third area 508 and a fourth edge 514d with the first area 506. The third and fourth edges 514c, 514d can be slanted relative to a horizontal or vertical plane. The fourth area 509 can comprise a light absorbing surface. The fourth area 509 can be a dark or black color.

The edges 514a, 514b, 514c, 514d, as described herein, can be non-orthogonal with respect to any side of the outer perimeter 502.

The slots 510, 512 can allow the emission of black body radiation to pass therethrough from a black body radiation source positioned behind the target, as described in more detail below with reference to FIG. 6. The slots 510, 512 can create holes or empty space in the calibration target 500a, 500b which can allow black body radiation to pass through the calibration target 500a, 500b. As discussed above, slots 510 can have a width that exceeds a height and can therefore be generally horizontal. Slots 512 can have a height that exceeds a width and can therefore be generally vertical. The use of horizontal slots 510 and vertical slots 512 can allow for measuring the Minimum resolvable temperature difference (MRTD) in both the X and Y directions.

FIG. 5B shows another example embodiment of a calibration target 500b. The calibration target 500b can share similar features and elements to calibration target 500a. The calibration target 500b can include an outer perimeter 502. The calibration target 500b can include a through hole 504. The through hole 504 can extend through the calibration target 500b. The through hole 504 can be positioned at or near the center of the calibration target 500b.

The calibration target 500b can include at least one calibration target element also referred to as a first area 506 or third area 508. The calibration target element 506, 508 can be positioned within the outer perimeter 502. The calibration target element 506, 508 can be a light or white color. The calibration target 500b can include at least one light absorbing surface, also referred to as a second area 507 or fourth area 509. The light absorbing surface can be a dark or black color. A plurality of slots (e.g., slots 510, 512) can extend through the at least one calibration target element 506, 508. In some embodiments, the plurality of slots can have a width that exceeds a height (e.g., slots 510). In some embodiments, the plurality of slots can have a height that exceeds the width (e.g., slots 512).

In some embodiments, the calibration target 500b can include more than one calibration target element (for example, include both first area 506 and second area 508) as shown in FIG. 5B.

Figure 6:
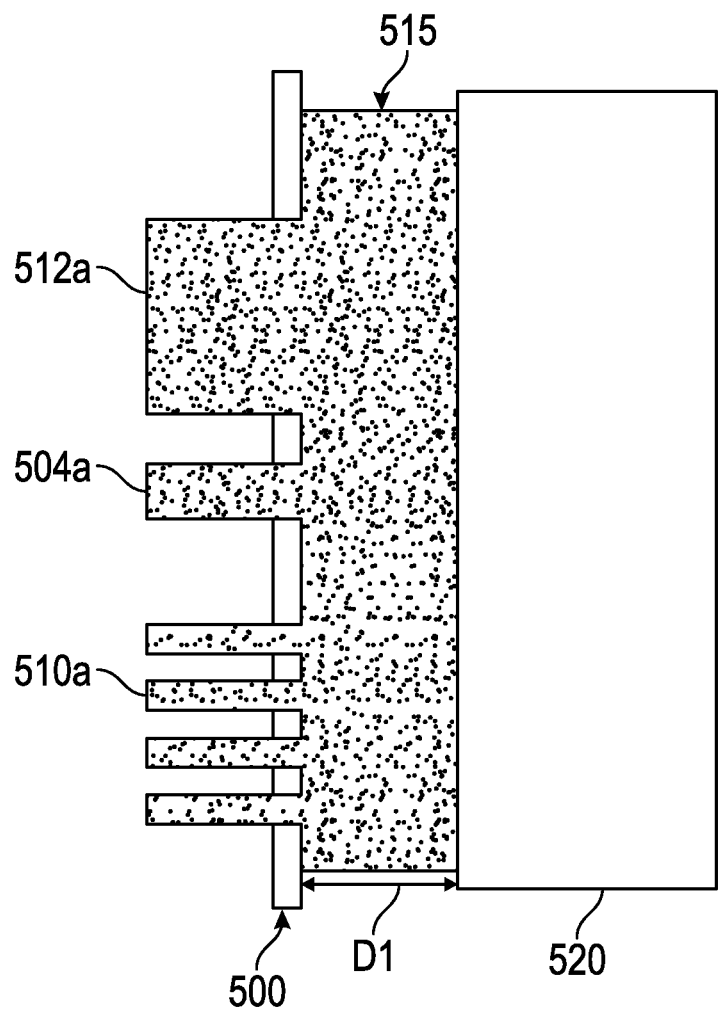
FIG. 6 is a side view of an example calibration target system including a black body source.

FIG. 6 is a side view of an example calibration target 500 (e.g., calibration target 500a, 500b) including a black body source 520. The black body source 520 can be positioned behind the calibration target 500. The black body source 520 can be positioned a distance D1 behind the calibration target 500. The black body source 520 can be positioned directly behind the calibration target 500. The distance D1 can be dependent upon the sensors being calibrated and their corresponding focus distances. The distance D1 can be dependent upon the hyperfocal distance of all sensors being calibrated. The setup of the calibration target 500 can be dependent on numerous factors including but not limited to the resolution of the sensors, the field of view of the sensors, and the focus distance of the sensors.

The black body source 520 can be configured to emit black body radiation. The black body source 520 can produce emissions through the target 500. For example, the emissions can pass through the through hole 504 and the slots 510, 512. For example, the emission 504a correlates to the through hole 504. The emissions 510a correlate to the plurality of slots 510. The emissions 512a correlate to the plurality of slots 512. The emissions are used to assist in the calibration of the sensors or cameras. The emissions 504a, 510a, and 512a are represented by the dark gray area 515. The dark gray area 515 represents the emissions 504a, 510a, and 512a passing through the corresponding through hole 504 and slots 510, 512 of the calibration target (e.g., calibration target 500a, 500b).

The calibration targets 500a, 500b are designed to allow all multiple (e.g., two, three, four, five or more) different camera systems (for example, cameras 202a as shown in FIG. 2), such as (Visible Cameras (VIS), Near Infrared Cameras (NIR), Short Wave Infrared Cameras (SWIR), Middle Wavelength Infrared Cameras (MWIR), and Long Wavelength Infrared Cameras (LWIR)) to be able to see the target and to be able to deduce valuable information from the target for calibration and performance testing. While all camera systems can be calibrated and/or tested at once, it is not necessary to calibrate/test all systems at the same time. Any number of cameras can be tested/calibrated at once. For example, one, two, three, four or five.

The through hole 504 with the black body emission can be used for position reference with regard to the MWIR and LWIR cameras. Minimum resolvable temperature difference (MRTD) testing is possible via the plurality of slots 510, 512 and the corresponding emissions 510a, 512a. The slanted edges 514a, 514b, 514c, 514d, can be used for MTF testing using the VIS, NIR, and SWIR cameras. The light absorbing surfaces can be used by the NIR and SWIR cameras.

The calibration targets 500a, 500b can lead to a reduction in the complexity of multi sensor calibration as a single calibration target can be used. The use of a single target also improves extrinsic calibration accuracy because the chance of variability between multiple targets is removed. The target is also capable of measuring optical performance of different types of optical systems, therefore extra data collection is not required.

Figure 7:
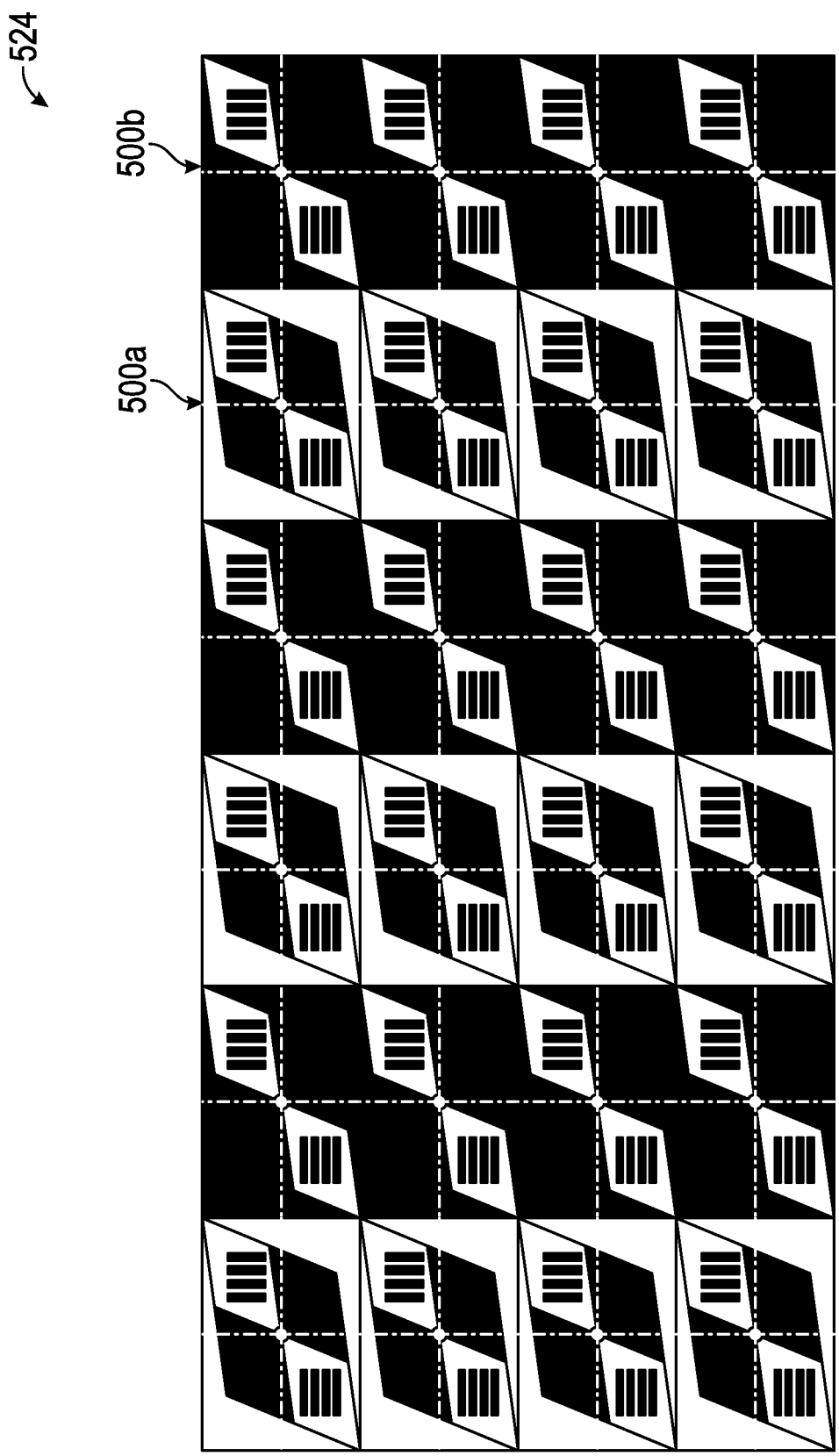
FIG. 7 is an example embodiment of a calibration grid including multiple calibration targets.

FIG. 7 is an example embodiment of a calibration grid 524 including multiple calibration targets or calibration target elements 500a, 500b. The calibration grid 524 can include any number of calibration targets 500a, 500b. For example, one, five, ten, fifteen, twenty or more calibration targets 500a, 500b. The number of calibration targets 500a, 500b can be determined based on the cameras and/or sensors being calibrated fields of view. The calibration targets 500a, 500b can be the same or different. The calibration targets 500a, 500b can alternate, for example, as shown in FIG. 7. The calibration grid 524 can alternate similar to a checkerboard pattern and can comprise alternating light and dark background areas. For example, adjacent calibration targets can alternate between light and dark background colors. The calibration grid 524 can have a width that exceeds a height, a width that equals a height, or a height that exceeds a width.

Figure 8:
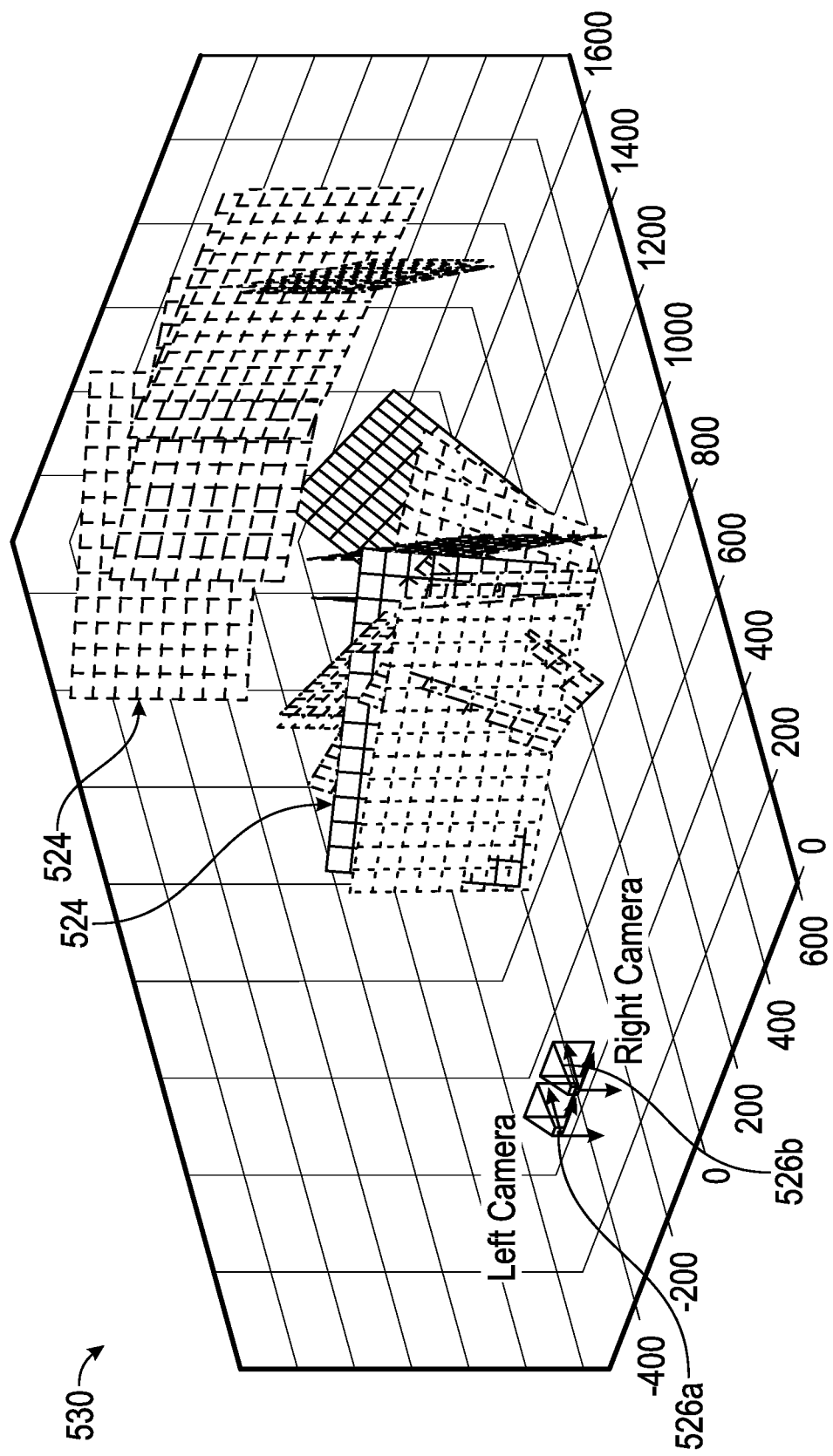
FIG. 8 is representative of an example calibration process.
Figure 9:
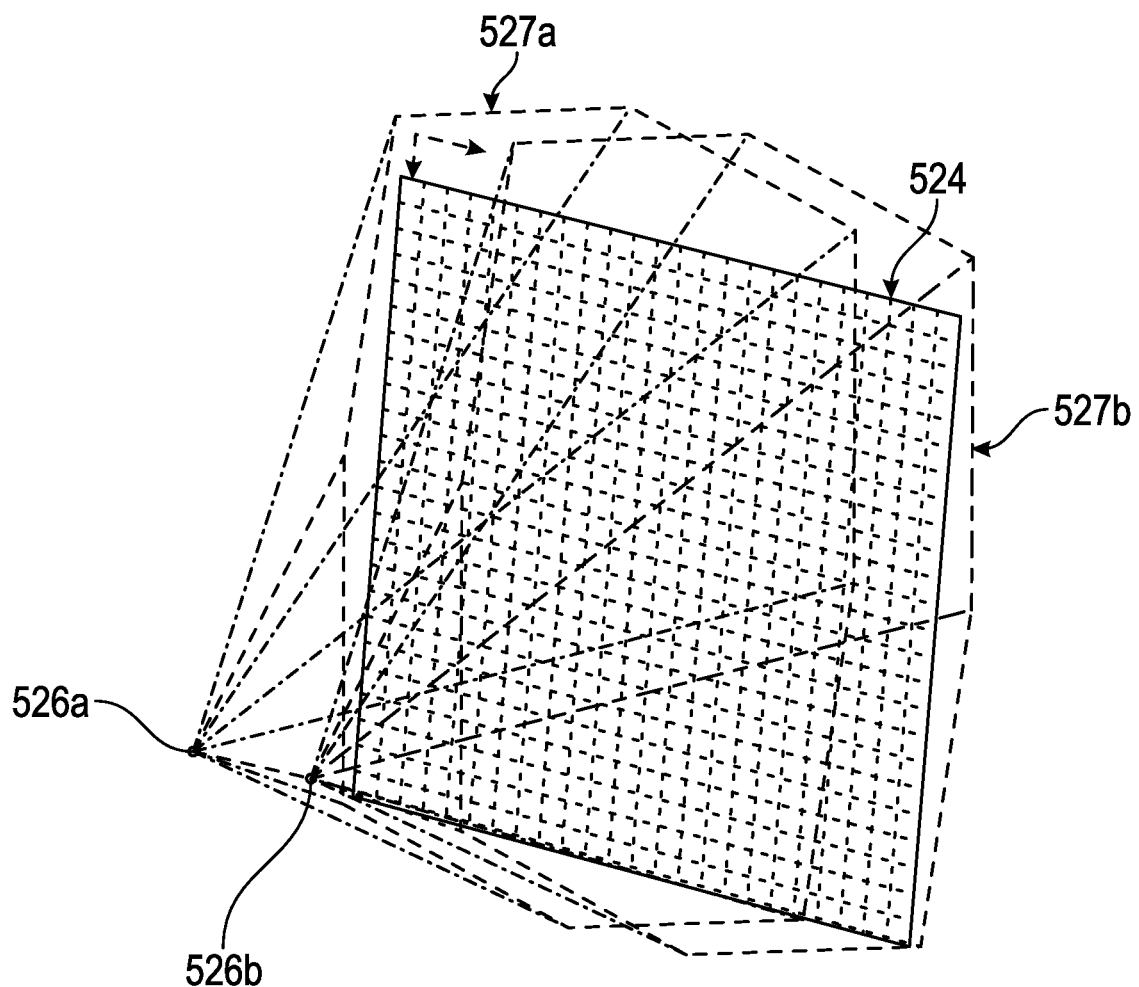
FIG. 9 is representative of another example calibration process.
Figure 10:
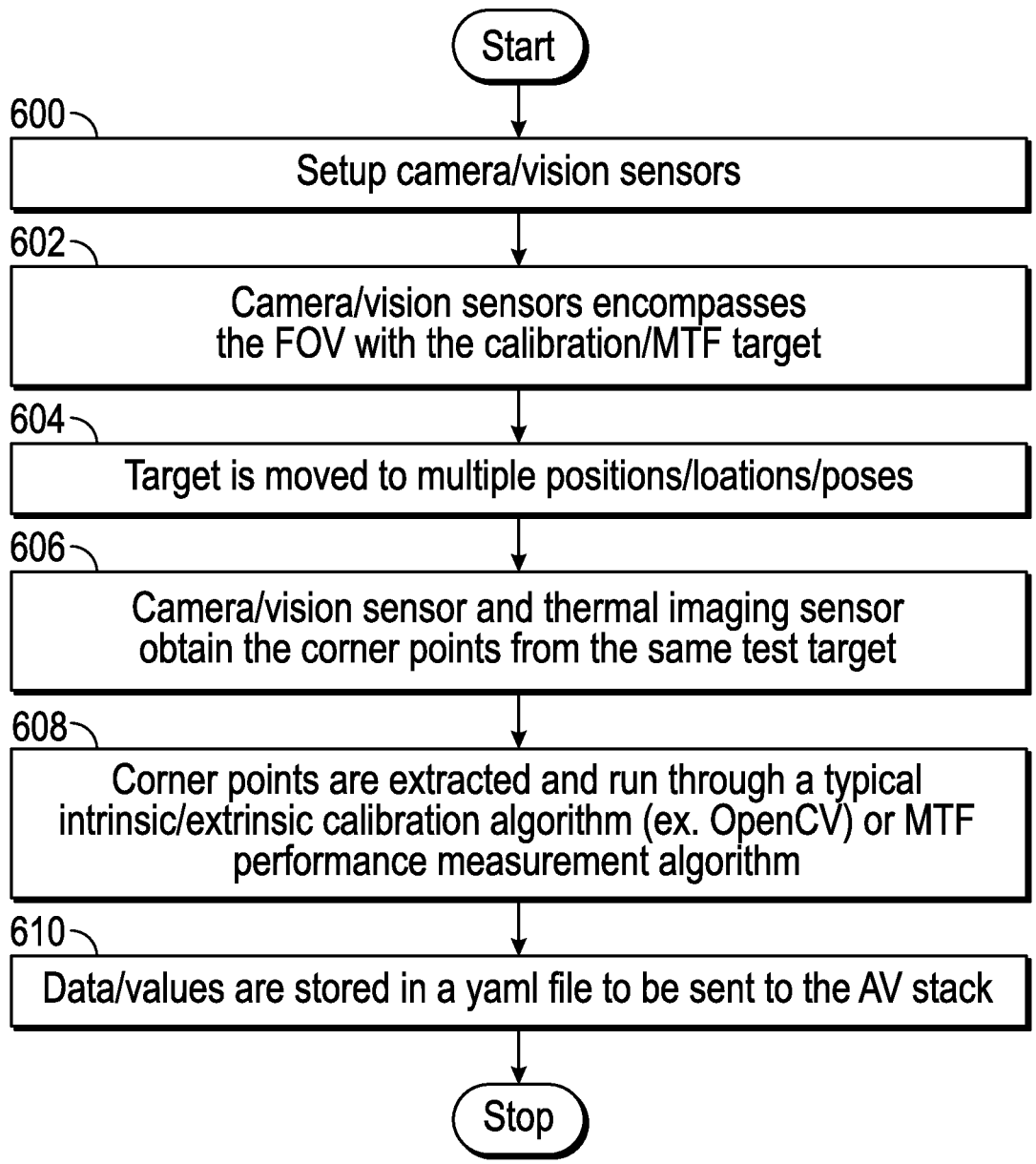
FIG. 10 is an example method of calibrating a sensor or determining a performance measurement.

FIGS. 8-10 are representative of an example calibration or performance measurement process or method. When calibrating or determining a performance measurement for a camera or cameras, a calibration target (e.g., calibration targets 500a, 500b) or a calibration grid (e.g., calibration grid 524) can be positioned in multiple positions, poses or locations, for example as shown in FIGS. 8 and 9. The use of multiple positions can ensure that the target is in view of all or substantially all field points of all cameras. The calibration grid can be angled in any direction, for example upward, downward, left or right.

FIGS. 8-9 show the use of two cameras 526a, 526b. The cameras 526a, 526b can be representative of any combination of cameras described herein. The two cameras 526a, 56b can be the same or different. While two cameras 526a, 526b are shown any number and combination of cameras can be calibrated or measured at once, as described herein. For example, one, two, three, four, five or more cameras. In some embodiments, the cameras 526a and/or 526b may be installed on a vehicle (e.g., a vehicle that is the same as or similar to vehicles 102 and/or vehicle 200). For example, the cameras 526a and/or 526b may be the same as or similar to cameras 202a of FIG. 2.

FIG. 8 shows various positions, poses, and/or locations for a calibration grid 524. As shown, the calibration grid 524 can be positioned at various angles relative to all planes of the grid 530. During calibration and performance measurement, the cameras 526a, 526b can remain stationary while the calibration grid 524 is moved between positions. The calibration grid 524 can be moved to as many positions/poses/locations as is necessary depending on the cameras 526a, 526b being calibrated. The number of positions needed can be dependent on the field of views of the cameras 526a, 526b. Any number of poses or positions can be used. For example, 5 poses, 15 poses, 25 poses, 35 poses, 45 poses, 55 poses or more. An increase in the number of poses or positions can increase the accuracy of the resulting calibration and/or measurement. The calibration targets can be positioned in pitch, yaw and/or roll angles. The calibration target can be positioned in poses or positions that provide about 70 percent or more of field of view coverage, about 80 percent or more field of view coverage, about 90 percent or more field of view coverage, or any value in between.

FIG. 9 shows the field of views of the cameras 526a, 526b. The field of view 527a corresponds to camera 526a and the field of view 527b corresponds to camera 526b. As shown, one or more of the field of views 527a, 527b can exceed the calibration grid 524. Thus, the movement of the calibration grid 425 during the calibration or performance measurement process can be necessary to cover the entire field of views 527a, 527b. The increase in poses or positions and the variation of those poses or positions can improve the outcome of the calibration and provide more accurate measurements.

FIG. 10 is a flow chart showing the process of calibrating or determining a performance measurement for a camera or cameras. In some embodiments, one or more of the functions of the process illustrated by FIG. 10 may be performed (e.g., completely, partially, and/or the like) by autonomous system 202 (e.g., one or more components of autonomous system 202). In some embodiments, one or more of the functions of the process illustrated by FIG. 10 may be performed (e.g., completely, partially, and/or the like) by another device or a group of devices separate from and/or including autonomous system 202, such as vehicles 102, remote AV system 114, and/or fleet management system 116.

Starting at block 600 the cameras and or vision sensors (e.g., cameras 526a, 526b) can be set in their fixed positions (e.g., one or more of the positions shown in FIG. 8). The testing can be conducted in a controlled or fixed environment or lab.

Moving to block 602, the camera/vision sensors are checked to ensure the field of views encompasses the calibration and/or MTF target.

Moving to block 604, the calibration and/or MTF target can be around to multiple positions, locations, and/or poses (e.g., one or more other of the positions shown in FIG. 8). For example, this can be done by using multiple pitch and yaw angles. The number of positions, locations and/or poses can be dependent upon the cameras being tested and their field of views. Any number of positions can be necessary, for example, two, four, six, eight, ten or more poses or any number in between.

Moving to block 606, the cameras/vision sensors and/or thermal imaging sensor can obtain the corner points of the calibration grid. Any sensors described herein may include a thermal imagining sensor. Moving to block 608, the corner points are extracted and processed through a typical intrinsic/extrinsic calibration algorithm (for example, Open CV) or a MTF performance measurement algorithm. Moving to block 610 the data and values collected are then stored, for example, in a yaml file, and can then be sent to an AV stack.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Various additional example embodiments of the disclosure can be described by the following clauses:

Clause 1: A calibration target system, comprising:
at least one calibration target element comprising:
an outer perimeter,
a modular transfer function (MTF) testing area positioned on the at least one calibration target element within the outer perimeter, the MTF testing area comprising a light-absorbing surface and at least one slant edge that is non-orthogonal with respect to any side of the outer perimeter,
a through hole extending through the at least one calibration target element, and
a plurality of slots extending through the at least one calibration target element; and
at least one black body source positioned behind the at least one calibration target element, the black body source configured to emit black body radiation such that the black body radiation passes through the through hole and the plurality of slots.

Clause 2: The calibration target system of Clause 1, wherein the MTF testing area comprises a checkerboard pattern comprising alternating light and dark areas.

Clause 3: The calibration target system of Clause 2, wherein the through hole is positioned at a central intersection of the checkerboard pattern.

Clause 4: The calibration target system of any of Clauses 2 or 3, wherein the plurality of slots extend through light areas of the checkerboard pattern.

Clause 5: The calibration target system of any of Clauses 1 to 4, wherein the plurality of slots comprise:
a first plurality of slots, each of the first plurality of slots having a height that exceeds a width and extending generally parallel to the first side of the outer perimeter; and
a second plurality of slots, each of the second plurality of slots having a width that exceeds a height and extending generally parallel to the second side of the outer perimeter.

Clause 6: The calibration target system of any one of Clauses 1 through 5, wherein:
the at least one calibration target element comprises a plurality of calibration target elements arranged in a grid; and
for each calibration target element within the grid, a first color of a background area formed between the outer perimeter and the MTF transfer area differs from a second color of the background area of adjacent calibration target elements within the grid.

Clause 7: The calibration target system of Clause 6, wherein the first color comprises a light color, and the second color comprises black.

Clause 8: The calibration target system of any one of Clauses 1 through 7, wherein the light-absorbing surface is configured to absorb visible light, near infrared light, and short wavelength infrared light.

Clause 9: The calibration target system of any of Clauses 1 to 8, wherein the plurality of slots are configured for minimum resolvable temperature (MRTD) testing by viewing the black body source through the plurality of slots.

Clause 10: A calibration target system, comprising:
at least one calibration target element, comprising:
an inner target positioned within the outer perimeter, the inner target comprising:

a first area having a first plurality of slots wherein each of the first plurality of slots have a width that exceeds a height, and a second area sharing a first edge with the first area, the second area comprising a light absorbing surface, a third area sharing a second edge with the second area, the third having a second plurality of slots wherein each of the second plurality of slots have a height that exceeds a width, a fourth area sharing a third edge with the third area and a fourth edge with the first area, the fourth area comprising a light absorbing surface, and a through hole extending through the at least one calibration target element, the through hole positioned at a center of the inner target; and wherein the first, second, third, and fourth edges are non-orthogonal with respect to a horizontal axis and a vertical axis of the at least one calibration target element; and at least one black body source positioned behind the at least one calibration target element, the black body source configured to emit black body radiation detectable through the through hole, the first plurality of slots, and the second plurality of slots.

Clause 11: The calibration target system of Clause 10, wherein the light-absorbing surfaces are configured to absorb visible light, near infrared light, and short wavelength infrared light.

Clause 12: The calibration target system of any one of Clauses 10 through 11, wherein the plurality of slots are configured for minimum resolvable temperature (MRTD) testing by viewing the black body source through the plurality of slots.

Clause 13: The calibration target system of any one of Clauses 10 through 12, wherein the second and fourth areas are black.

Clause 14: The calibration target system of any one of Clauses 10 through 13, wherein the first and third areas are a light or white color.

Clause 15: The calibration target system of any one of Clauses 10 through 14, wherein the at least one calibration target element comprises a plurality of calibration target elements arranged in a grid.

Clause 16: The calibration target system of Clause 15, wherein for each calibration target element within the grid, a first color of a background area differs from a second color of the background area of an adjacent calibration target elements within the grid.

Clause 17: A method of calibrating a camera or sensor system, comprising:

receiving, using at least on processor, from a first camera system, first image data based on light reflected from a calibration target, wherein the calibration target comprises:

an outer perimeter, a modular transfer function (MTF) testing area positioned on the at least one calibration target element within the outer perimeter, the MTF testing area comprising a light-absorbing surface and at least one slant edge that is non-orthogonal with respect to any side of the outer perimeter, a through hole extending through the at least one calibration target element, and a plurality of slots extending through the at least one calibration target element; and receiving, using the at least one processor, from a second camera system, second image data based on black body radiation emitted through the slots of the calibration target; and calibrating, using the at least one processor, the first and second camera systems based on the first and second image data.

Clause 18: The method of Clause 17, wherein the calibration target is moved from a first position to a second position.

Clause 19: The method of Clause 17 or 18, wherein the camera or sensor system is stationary.

Clause 20: The method of any one of Clauses 17 through 19, wherein the MTF testing area comprises a checkerboard pattern comprising alternating light and dark areas.

What is claimed is:

1. A calibration target system, comprising:
   at least one calibration target element comprising:
     an outer perimeter,
     a modular transfer function (MTF) testing area positioned on the at least one calibration target element within the outer perimeter, the MTF testing area comprising a light-absorbing surface and at least one slant edge that is non-orthogonal with respect to any side of the outer perimeter,
     a through hole extending through the at least one calibration target element, and
     a plurality of slots extending through the at least one calibration target element; and
   at least one black body source positioned behind the at least one calibration target element, the black body source configured to emit black body radiation such that the black body radiation passes through the through hole and the plurality of slots.

2. The calibration target system of claim 1, wherein the MTF testing area comprises a checkerboard pattern comprising alternating light and dark areas.

3. The calibration target system of claim 2, wherein the through hole is positioned at a central intersection of the checkerboard pattern.

4. The calibration target system of claim 3, wherein the plurality of slots extend through light areas of the checkerboard pattern.

5. The calibration target system of claim 4, wherein the plurality of slots comprise:
   a first plurality of slots, each of the first plurality of slots having a height that exceeds a width and extending generally parallel to the first side of the outer perimeter; and
   a second plurality of slots, each of the second plurality of slots having a width that exceeds a height and extending generally parallel to the second side of the outer perimeter.

6. The calibration target system of claim 1, wherein:
   the at least one calibration target element comprises a plurality of calibration target elements arranged in a grid; and
   for each calibration target element within the grid, a first color of a background area formed between the outer perimeter and the MTF transfer area differs from a second color of the background area of adjacent calibration target elements within the grid.

7. The calibration target system of claim 6, wherein the first color comprises a light color, and the second color comprises black.

8. The calibration target system of claim 1, wherein the light-absorbing surface is configured to absorb visible light, near infrared light, and short wavelength infrared light.

9. The calibration target system of claim 8, wherein the plurality of slots are configured for minimum resolvable temperature (MRTD) testing by viewing the black body source through the plurality of slots.

10. A calibration target system, comprising:
at least one calibration target element, comprising:
an inner target positioned within the outer perimeter, the inner target comprising:
a first area having a first plurality of slots wherein each of the first plurality of slots have a width that exceeds a height, and
a second area sharing a first edge with the first area, the second area comprising a light absorbing surface,
a third area sharing a second edge with the second area, the third having a second plurality of slots wherein each of the second plurality of slots have a height that exceeds a width,
a fourth area sharing a third edge with the third area and a fourth edge with the first area, the fourth area comprising a light absorbing surface, and
a through hole extending through the at least one calibration target element, the through hole positioned at a center of the inner target; and
wherein the first, second, third, and fourth edges are non-orthogonal with respect to a horizontal axis and a vertical axis of the at least one calibration target element; and
at least one black body source positioned behind the at least one calibration target element, the black body source configured to emit black body radiation detectable through the through hole, the first plurality of slots, and the second plurality of slots.

11. The calibration target system of claim 10, wherein the light-absorbing surfaces are configured to absorb visible light, near infrared light, and short wavelength infrared light.

12. The calibration target system of claim 10, wherein the plurality of slots are configured for minimum resolvable temperature (MRTD) testing by viewing the black body source through the plurality of slots.

13. The calibration target system of claim 10, wherein the second and fourth areas are black.

14. The calibration target system of claim 10, wherein the first and third areas are a light or white color.

15. The calibration target system of claim 10, wherein the at least one calibration target element comprises a plurality of calibration target elements arranged in a grid.

16. The calibration target system of claim 15, wherein for each calibration target element within the grid, a first color of a background area differs from a second color of the background area of an adjacent calibration target elements within the grid.

17. A method of calibrating a camera or sensor system, comprising:
receiving, using at least one processor, from a first camera system, first image data based on light reflected from a calibration target, wherein the calibration target comprises:
an outer perimeter,
a modular transfer function (MTF) testing area positioned on the at least one calibration target element within the outer perimeter, the MTF testing area comprising a light-absorbing surface and at least one slant edge that is non-orthogonal with respect to any side of the outer perimeter,
a through hole extending through the at least one calibration target element, and
a plurality of slots extending through the at least one calibration target element; and
receiving, using the at least one processor, from a second camera system, second image data based on black body radiation emitted through the slots of the calibration target; and
calibrating, using the at least one processor, the first and second camera systems based on the first and second image data.

18. The method of claim 17, wherein the calibration target is moved from a first position to a second position.

19. The method of claim 17, wherein the camera or sensor system is stationary.

20. The method of claim 17, wherein the MTF testing area comprises a checkerboard pattern comprising alternating light and dark areas.

* * * * *